Feb. 2, 1965    E. ZIVIANI    3,167,957
HEAT METER

Filed July 11, 1960    4 Sheets-Sheet 1

INVENTOR.
BY Enzo Ziviani

Feb. 2, 1965  E. ZIVIANI  3,167,957
HEAT METER
Filed July 11, 1960  4 Sheets-Sheet 2
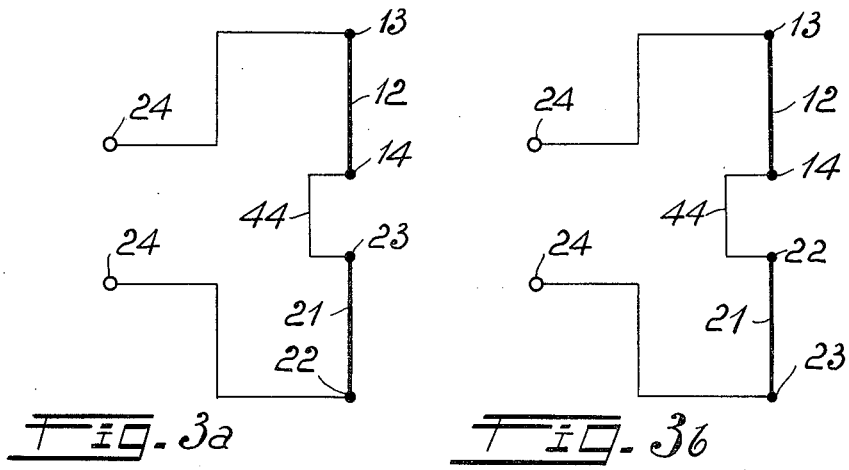
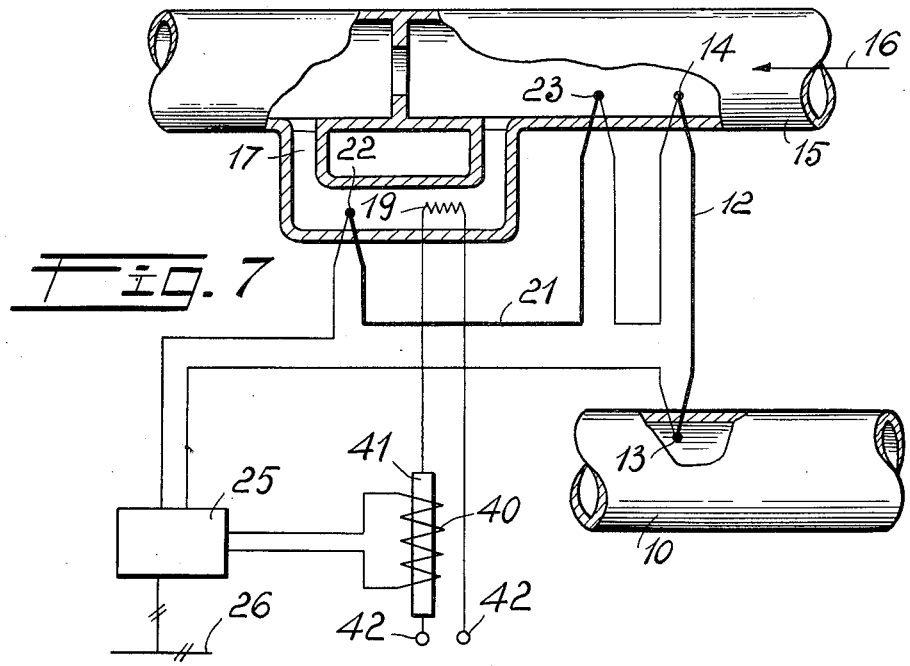
INVENTOR.
BY Enzo Ziviani INVENTOR.
Enzo Ziviani

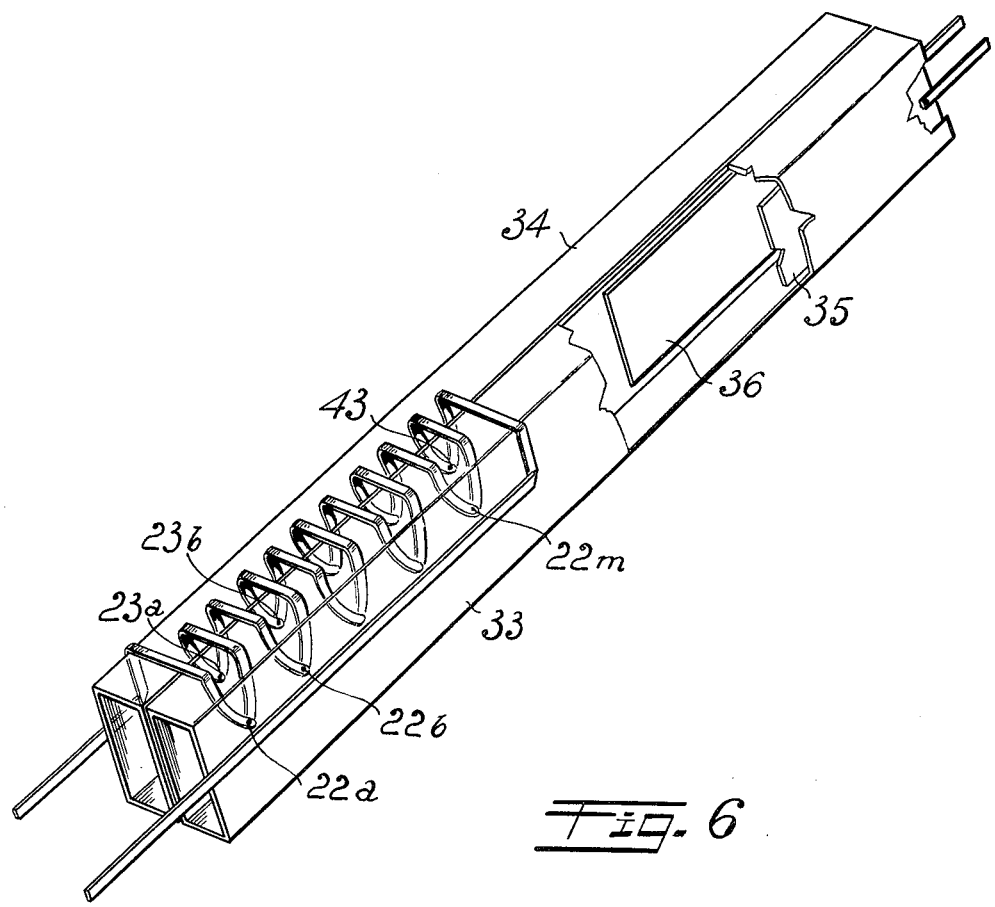

United States Patent Office 3,167,957
Patented Feb. 2, 1965

3,167,957
HEAT METER
Enzo Ziviani, Legnago, Verona, Italy, assignor to Riello Filli Officine Fonderie, Legnago, Verona, Italy
Filed July 11, 1960, Ser. No. 42,111
Claims priority, application Italy, July 14, 1959, 11,899/59, 11,900/59
2 Claims. (Cl. 73—193)

This invention relates to a heat counter particularly suitable for measuring heat utilized in hot water heating systems and, more particularly, in such systems in which a plurality of utilization points are served by a single heating plant. It is clear, in such cases, that it is of interest to measure exactly the heat utilized by each user, so that payment may be effected on the basis of actual consumption. The problem has been felt for some time past and numerous solutions have been suggested, but none of these has proved satisfactory inasmuch as none is able to effect exact measurement using for the purpose simple and inexpensive means of sure and constant operation.

For a considerable time past the method has been known by which the heat consumed by each user is measured by heating the fluid which has circulated in the system, subsequently cooling it to its inlet temperature, and measuring the heat required for such heating, which is clearly equal to heat transferred during passage through the system. Another known method is that of effecting measurements of heat content on a fraction suitably separated of the flow passing through the system. It has also been suggested to separate or shunt a fraction of the flow and cause it to pass through a tube of small section immersed in a calorimetric fluid which is heated electrically to the temperature of the heating fluid at the plant inlet and to measure continuously the quantity of heat absorbed by the calorimetric fluid.

However, these methods do not allow for obtaining a really exact measure of the quantity of heat transferred by the heating fluid and besides these methods are too costly. It is actually clear that if it is necessary to impart a certain amount of heat to the fluid or part thereof at the system outlet in order to measure the quantity of heat transferred in a heating system, if said amount is not negligible in respect of that consumed by the heating system, the said measure influences the economy of the system considerably.

The principal object of this invention is to provide a new process and device for measuring heat in heating systems of the aforementioned types, allowing of perfectly exact measuring at a negligible cost.

The process according to the invention is characterized by the fact that a predetermined fraction (which will be called "fractional flow") of the heating fluid which has circulated through the system, is heated to such a temperature that the difference between this temperature and that at system outlet is a predetermined fraction of temperature drop of the fluid when passing through the plant.

It is preferable that heating of the fractional flow be effected by generation of heat in the mass of the fluid itself, more particularly by means of electrolytic heating.

The process according to the invention presents other features and advantages which will clearly appear in the course of this specification. The device according to the invention is characterized by the fact that it comprises a combination of the following means: means inserted in the heating system outlet for separating or shunting a determined submultiple of heating fluid flow; means for heating the shunted or separated fractional flow; and means which I will call "electric demultiplicator" for controlling the said heating means in such a way that the temperature increase caused by them is a predetermined submultiple of the temperature differential of the fluid between inlet and outlet of the heating system being considered.

It is preferable that the device should include also a device which I will call "thermic retarder" the purpose of which is to avoid any noticeable temperature oscillations of the fractional flow heated around measurement temperature.

It is preferable that the means for shunting or separating a submultiple of fluid flow, be based on the hydraulic similarity and effects the subdivision of fluid flow into equal fractional parts of the whole. It is also preferable that it be made so to allow for measuring the temperature in an area in which the speed front of the fluid is still close to the flat, i.e. distribution of speed is quite uniform in the transversal section as it is in turbulence conditions. Preferably the electric demultiplicator comprises a series of thermoelectric couples, all equal to one another arranged in series, in opposition with a single couple, each of the series connected couples generating an electromotive force multiple of that generated by said opposition couple by equal temperature differential between joints.

These and other features and advantages of the heat counter according to the invention will clearly result from the description of preferred embodiments with reference to the attached drawings, wherein.

Figure 4:
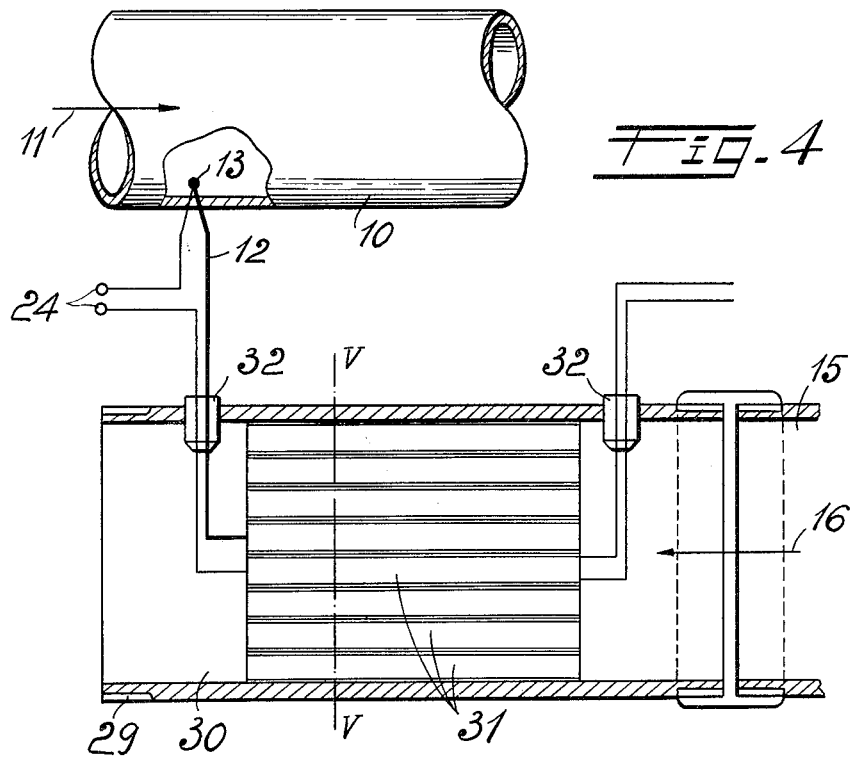
Figure 5:
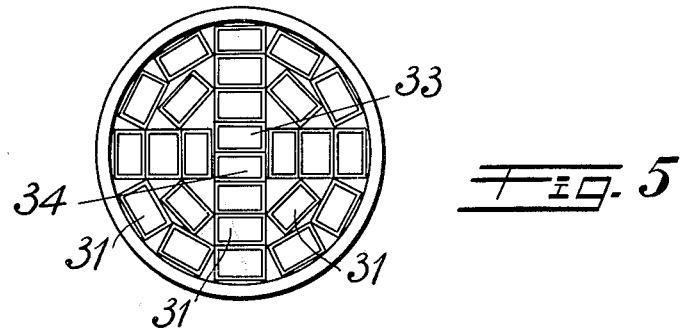

FIGS. 3a and b are diagrammatic views of two different ways of connecting the thermoelectric couples;

FIG. 4 shows a further embodiment of the heat counter according to the invention;

FIG. 5 is a cross section of FIG. 4 on lines V—V;

FIG. 6 shows an enlarged detail of the heat counter of FIGS. 4 and 5;

FIG. 7 illustrates diagrammatically the device called "thermic retarder."

Figure 1:
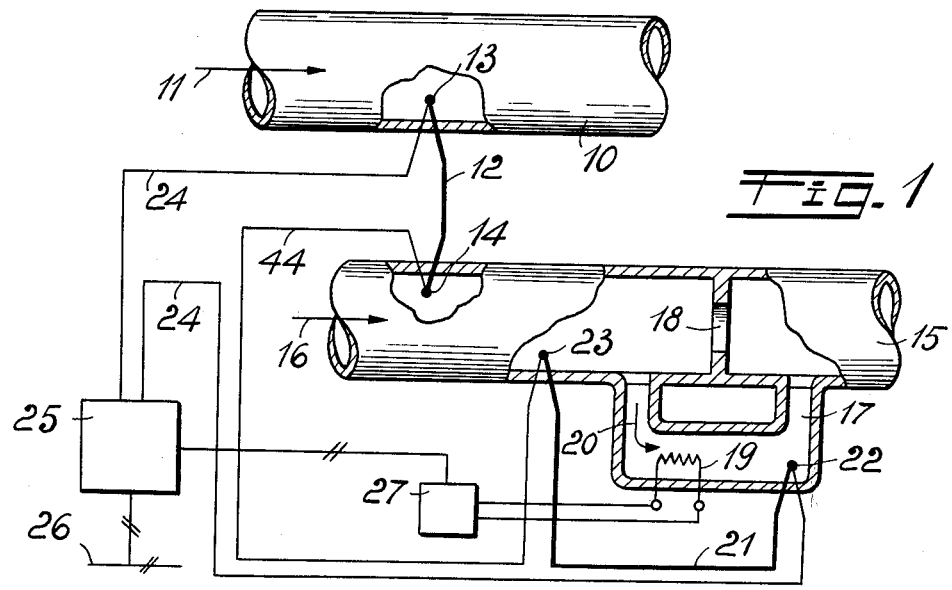
FIG. 1 is a diagrammatic view of a first embodiment of the invention.

Referring to FIG. 1, reference 10 indicates the tube through which the hot heating fluid enters flowing in the direction indicated by arrow 11 in the utilizing point (not illustrated) of which it is wished to measure the amount of heat absorbed or consumed. As shown diagrammatically in the partial section, one joint 13 of a first thermoelectric couple 12 is located within tube 10, the second joint of the thermoelectric couple 12, i.e. joint 14, being located in tube 15 through which cold heating fluid comes out in the direction of arrow 16, after having transferred to the utilization point part of its heat. Consequently, joint 13 is the hot one and joint 14 the cold one of couple 12.

From tube 15 a fraction amounting to "$1/m$" of the total flow is shunted. The way in which this shunting or separation is effected is shown in FIG. 1, wherein a shunting tube 17 is suitably placed in respect to a narrowing 18 of tube 15. The way in which the shunting is effected in the device preferably used for carrying out the process of invention will be described later on. A heating means for heating fluid is placed within tube 17. This means may be as shown a heating resistance 19, but in its preferred embodiment it will be a different device. The heating fluid passes into shunt 17 in the direction shown by arrow 20. In FIG. 1 a second thermoelectric couple 21 is mounted with joint 22 in an area of tube 17, where the fluid passes after having been heated by means of resistance 19, the second couple joint 23 being placed in tube 15 upstream shunt 17. Consequently joint 23 is the cold joint and joint 22 is the hot one of thermoelectric couple 21. This latter couple is made in such a way that its electromotive force would be "$m$" times the electromotive force of couple 12 when the temperature differences between the respective end joints would be equal or, better, it is so constructed as to generate the same electromotive force as couple 12, when the temperature difference between joints 13 and 14 of couple 12 is equal to "$m$" times the temperature difference between joints 22 and 23 of couple 21.

In practice instead of a single couple 21 it is preferred to use a plurality of equal couples connected in series as is fully explained later.

The said two couples 12 and 21 are connected to common terminals 24 in such a way that when there is the aforesaid ratio between temperature differentials, there is practically no electromotive force at terminals 24.

The couples may be connected in two different ways. If couples 12 and 21 generate electromotive forces of the same direction they will be connected as shown in FIG. 3a, i.e. the two cold joints or the two hot ones) are mutually connected while the remaining two joints are connected to the terminals. If, on the other hand, the two couples generate electromotive forces of opposite directions, they will be connected as shown in FIG. 3b, i.e. the hot joint of one couple will be connected to the cold joint of the other while the remaining two joints are connected to the terminals. The first case, shown in FIG. 3a, happens if, for example, couple 12 is a copper-iron one and couple 21 iron-constantan; the ratio between the electromotive force generated by the two couples is approximately 1 to 5 and the directions are the same, i.e. the normal direction of current flow of both couples is from the cold to the hot joint.

Figure 2:
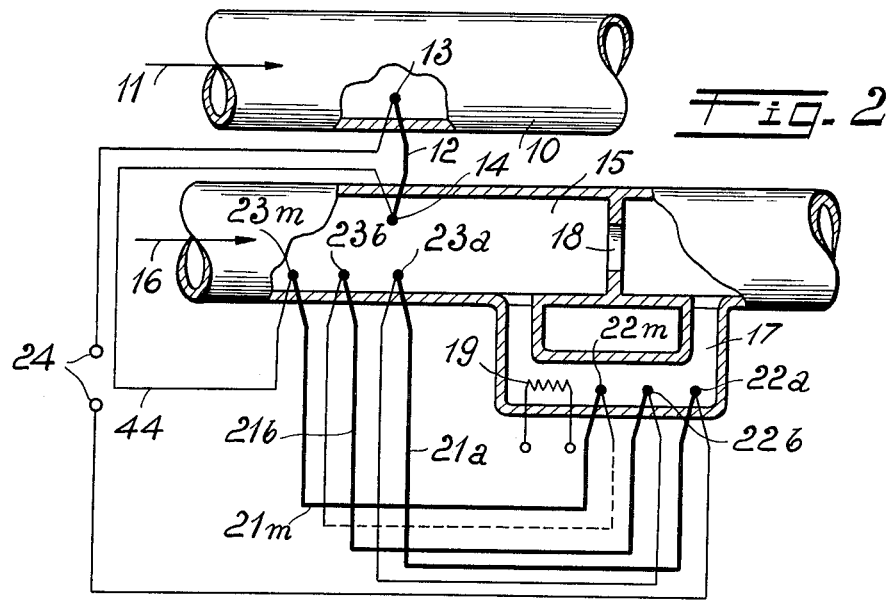
FIG. 2 is a diagrammatic view of a somewhat modified embodiment.

In FIG. 1 the said first arrangement has been employed. Another way of obtaining the desired ratio between the electromotive forces of the two couples is shown in FIG. 2 where, instead of a single couple 21 differing from couple 12, a series of couples 21a, 21b, 21m have been used, each equal to couple 12 and connected in series to sum up their electromotive forces.

The hot joint of couple 21a will then be connected to a terminal 24 and the cold joint of couple 21m will be joined to the cold joint of couple 12, thus following the arrangement of FIG. 3a. In either way, however, the "$m$" values obtained are relatively low. To increase said values, the two systems abovementioned are combined, i.e. instead of a single couple 21, a plurality of series connected couples are used, each of which generates an electromotive force which is a multiple of the same or opposite direction, of that generated by said couple 12, at equal temperature differentials. For example, by using an iron-copper couple 12 and five 21a, ... 21m iron-constantan couples in series, ratio "$m$" rises to $5 \times 5 = 25$. In this way very high "$m$" ratio values are obtained. Later in this description, I shall—for the sake of simplicity—always refer to a single couple 21, but it should be borne in mind that in practice it is possible to have, as it is indeed, the general practice, a certain number of couples connected in series. In this case joints 22 or 23 to which this specification refers when indicating the series of couples, comprise respectively all hot and cold joints of the said series of couples; this explanation will not be repeated and must always be understood.

The arrangement of couples 12 and 21 form the electric demultiplier. Instead of thermoelectric couples other temperature detector devices can be used, i.e. such as are capable of controlling relays or other equivalent devices, such as expansion thermometers having different thermal expansion coefficients or resistors with resistance values varying according to temperature, having different temperature coefficients. The very considerable advantage afforded by the demultiplier is clear; it allows of reduced cost and greater simplicity of parts and devices required for effecting measures and, above all, very considerable accuracy and stability inasmuch as it is free from outside power sources.

A relay 25 is connected with terminals of the two couples 12 and 21 connected in opposition and said relay is electrically or magnetically polarized so as to close an electric contact when the temperature differential between the two joints of couple 21 is below "$1/m$" of the temperature differential between the two joints of couple 12, i.e. when at terminals 24 there is an electromotive force of a certain sign, said contact opening when electromotive force is zero or (an hypothesis which theoretically should never arise) of opposite sign. When the relay is closed the heating means is energized by network 26 through an electric meter 27 which integrates the power absorbed by the resistance 19. This power is equal to a "$1/nm$" fraction of the heat used by the utilizer being considered; it is, therefore, easy to calculate this heat and this value may be directly shown by meter 27 which is suitably calibrated and provided with a proper scale for the purpose. It is to be noted that when heat used by the utilizer varies slowly in time, the heat meter according to the invention can be made to operate intermittently so as to reduce still further the power absorbed by the measure, but this is usually unnecessary as the "$nm$" reduction ratios obtained by means of the invention are already very high.

In order to obtain a static control unit free from aging and wear phenomena, relay 25 may be replaced by a different device, for example a saturable inductance adapted to control the heating means 19 by modulation instead of by intermittance.

A device with which the process of the invention is preferably put in practice is shown in FIGS. 4, 5 and 6. Using the same numbers of the preceding figures to indicate some parts, in FIG. 4 I still have an inlet tube 10 from the heating plant in which the hot joint 13 of thermoelectric couple 12 is located in an outlet tube 15 from the utilisation point. Arrows 11 in 16 show flow direction. Shunt 17 is effected here as follows. For example a tube section 30 is interposed by means of threading 39 or flanges or other connection means in tube 15. A series of small tubes 31 are replaced inside tube 30 and this is better illustrated in the sectional view of FIG. 5. Two of these are shown in a perspective view on a larger scale and for the sake of clarity as if they were transparent (see FIG. 6). The series of tubes 31 may be replaced by a single plastic body in which an equivalent number of channels are provided, said body occupying the whole section of tube 15 and being obtained by extruding a thermoplastic material or by moulding; they can, however, be made by other methods as by joining by means of a suitable binder a sufficient number of small tubes preferably made of plastic material. The use of plastic material having low heat conducting characteristics is useful for obtaining optimum operation of the device inasmuch as heat transmission from the several small tubes is avoided; otherwise such transmission of heat would influence measurement precision adversely. All other means of insulation could be used or other arrangements could be adapted for the small tubes, on condition that there is sufficient insulation between the small tubes in which temperature measure is effected and these are preferably chosen among those placed more inside of the assembly so as to avoid influence of outside temperature and reduce the necessity of insulation between one another and the outside.

It is essential that there should be a perfect hydraulic similarity between the tubes 31, i.e. they should be identical as to length and section and should offer the same resistance to fluid flow. In this manner fluid flow in tube 15 is sub-divided or separated in a uniform manner between the tubes and if they are "$n$" in number, flow in each tube is "$1/n$" of total fluid flow. In this way I obtain the desired shunt as shown diagrammatically in FIG. 1, even if—in this case—it is not strictly correct to speak of a shunt but rather of a subdivision of fluid flow in "$n$" equal partial flows. The word "shunt," when used in this specification is intended to include said sub-division too.

A suitable number of watertight passages 32 allow the rheophores of the thermoelectric couples and of the heating means to be conducted outside tube 30.

For effecting measure, it has been preferred to employ two central tubes 33 and 34 shown in FIG. 5. For example, in one of these tubes, say tube 33, the heating fluid is heated, more particularly, water flowing in said tube, preferably by generation of uniform heat inside water current. To this end, the preferred heating means consists in two metal electrodes 35 and 36—clearly shown in FIG. 6—applied to the opposite walls of said tube. These electrodes are furnished with rheophores passing through passages 32; as previously described said rheophores are connected through an electric meter and a relay to an electric source not shown. The electric current passes (by electrolytic conduction) through the mass of water from one electrode to the other, causing heating of same.

A similar result could be obtained by other means, for example by dielectric loss heating, if the conductivity of the heating fluid is sufficiently low as might occur in the case of distilled water (e.g. condensate water). The use of electric resistances which heat the liquid by conduction and convection is not excluded.

Water passing in tube 34 is not influenced by the water flowing through tube 33 thanks to insulation due to the plastic material used, or to other insulating means well known in the art. Consequently, in small tube 34 the water is at the temperature of the water discharged from the utilization point, i.e. of tube 15. Therefore, the thermoelectric couple 21 is placed with hot joint 22 in tube 33 and cold joint 23 in the neighbouring tube 34.

Naturally, if several thermocouples in series are used instead, all hot joints will be placed in tube 33 and the corresponding cold joints in tube 34, the joints being connected as shown in FIG. 2.

Cold joint 14 of couple 12 is also placed in small tube 34 as it has to show the same temperature and may be located close to joint 23.

Being fitted in the same tube the terminals of connecting cable 44 between joints 14 and 23 are isotherms, in FIGS. 1 and 2. Consequently, this cable should be eliminated, without there being any alteration of the thermoelectric phenomenon previously described.

In the particular case used as example, in which couple 12 is made of iron and copper and couple 21 of iron and constantan, the copper of cold joint 14 can be directly welded to the constantan of cold joint 23, omitting the iron connection, indicated by 44 in FIGS. 1, 2 and 3a.

For evident practical reasons, this embodiment of the invention described and shown in FIG. 6 is the preferred one. Consequently, in FIG. 6, this connection is indicated by reference 43 and, with reference to FIGS. 1 and 3a, forms the joint obtained by joining joint 14 to joint 23 and omitting conductor 44.

Thus joint 43 operates as cold joint at the same time for couples 12 and 21, taking the place of joints 14 and 23. The same may be said for FIGS. 2 and 6 bearing in mind that, in this case, the connection is effected between joint 14 and joint 23m.

On account of identity of the thermoelectric phenomenon, in this description reference will be made either to the assembly with joints 14 and 23 separated, or combined in joint 43, inclusive of joints 14 and 23.

The device shown allows of effecting measure of the desired accuracy, as it permits heating a flow that is an exact submultiple of total flow, obtaining an uniform heating and the same temperature at the several points, so that temperature measure is accurate.

To undesrtand the difficulties connected to obtaining of these results, it will be necessary to make the following comments.

In preceding efforts to measure heat used by a plant, by means of measurements effected on a fraction of fluid flow, the principle of deriving (shunting) a fraction of its flow by means of a tube of reduced section has always been followed. But it is impossible to obtain the derivation (shunting) of a constant fraction of total flow if the hydraulic conditions in the main tube and the shunt tube are not the same. As the shunt tube is necessarily of small section in order to obtain a rather small flow and there is, consequently, a laminar flow, the desired flow cannot be derived with accuracy if the flow conditions in the main tube are not also laminar. And, naturally, this does not occur normally in the tubes of heating plants. With the device described, on the other hand, flow is equally distributed among the several tubes 31 and, therefore, each of these always carries the desired fraction of the total flow, whatever the flow conditions in tube 15 may be.

However, with this, the problem of the accurate measure of heat supplied is not solved. To obtain such accurate measure, it is first of all necessary that heating of water be prompt and uniform, which result is preferably obtained with the device according to the invention by causing generation of heat in the mass of heating fluid, or in any case by heating said fluid directly.

This result could not be obtained if the heating fluid were to be heated by an intermediate calorimetric fluid in which the shunt tube were immersed. But this is not yet sufficient for accurate measuring of heat. This clearly depends on the accurate measure of temperature differential between tubes 33 and 34 effected by the couple or series of couples 21. It should be borne in mind that in a small section tube in which fluid flows in laminar conditions, speed differs considerably to the greater or lesser distance from the tube axis of the point in which joint of couple used for temperature detection is placed. The speed front in laminar conditions is actually parabolic; on the other hand, it is clear that the temperature taken by the water decreases in proportion to height of speed, so that on coming close to the tube axis lower temperatures will be detected in the same section.

According to the invention, this trouble is obviated as follows. It is borne in mind that the speed parabolic front in a small diameter tube is not reached immediately, but only a certain distance from tube inlet. Actually, at the beginning the speed front is flat as in turbulent conditions and it is only a very thin strata which adheres to the wall, its speed falling to zero value. Gradually the speed front is deformed, a central part remaining flat but decreasing in area until it disappears completely.

An entirely parabolic front is reached at the distance equal to $.05.d.R_e$ in which $d$ is the tube diameter (presumed to be of equivalent circular section) and $R_e$ is Reynold's number. According to the invention, length of small tubes 31, or—at any rate—the distance between the mouth of small tube 33 and the point at which joint 22 is placed, is kept under the abovementioned distance and the joints of couples in small tube 33 are arranged at different distances from the tube axis instead of being in alignment; this latter arrangement may be used independently of determination of distance indicated above.

As an example, starting from a 2" metal tube, 26 small tubes measuring about 11 x 6 mm. were mounted therein. The distance between inlet of tubes and location of couples is about 10 cm., and therefore close to the distance calculated according to the formula given above, duly corrected so as to take in consideration the rectangular section of tubes, which for the minimum value obtainable in practice of $R_e=200$ was equal to approximately 10 cm.

For higher water speeds, increasing $R_e$, the formula gives ever increasing and, therefore, favourable values.

Should $R_e$ increase to the point of producing turbulent motion, the flat speed front will be obtained spontaneously as it is characteristic of these conditions of flow. Further, to make up for the inevitable deformation of speed front, which occurs towards the end of the tube and allow of fair precision also in the case of minimum flow to which very low $R_e$ values correspond and, consequently a less flat speed front, couples in tube 33 are actually not aligned but spread out as to be influenced by various sections of the fluid vein, detecting on the whole temperature close to the mean value. Using (as in the example given in connection to FIGS. 1 to 3) a value of "m" equal to 25, the product "nm" was equal to 650, i.e. the power employed for measurng is 1/650 of the power absorbed by the utilizer. Consequently, measure although accurate, costs a negligible amount. However, in order to obtain high precision measure, it is also desirable to avoid any oscillation of the temperature of the heated water around the value it is to reach. To this end, the device called "thermic retarder" is resorted to. This device is shown in FIG. 7. The heating means 19 is fed as shown in FIG. 1, i.e. through the relay 25, until such time as the electromotive force generated by the couple or series of couples 21, is equal, as absolute value, to that generated by couple 12. Consequently, when the temperature of fluid at joint or joints 22 falls below a predetermined value, heating means 19 are connected to the electric power source and the fluid in shunt tube 17 (FIGS. 1 and 2) or 33 (FIGS. 5 and 6) is heated until the predetermined temperature is reached and consequently the electromotive forces are equal.

However, this feed system is discontinuous and generates temperature oscillations, inasmuch as high power values being supplied for short periods of time followed by long pauses, the desired temperature is inavoidably passed in the fluid, on account of inertia response of joint or joints 22. The measure thus effected is very inaccurate as it is influenced by the errors due to difference in gradients between the heating and the cooling processes, heating mediums and joints of thermoelectric couples. Considerable errors result and such errors are generally positive and are very evident especially at small values. Besides, the system described requires peak electric power much higher than the maximum mean value foreseen; consequently control and measurement parts are subjected to alternative high frequency operation which reduces efficiency and life of parts.

A system using a saturable reactor or a magnetic or electronic amplifier in place of relay 25 is not usually capable of affording proportional operation. Actually, on account of the inevitable oscillations of temperature in opposite directions which occur on joint 22, the amplifier is, in practice, alternately and cleanly unlocked and locked, behaving in the same way as the electromechanical relay 25.

A method for avoiding this trouble may consist of feeding by means of relay 25 or the amplifier a reversible motor suitably demultiplied which, acting on a potentiometer, varies feeding voltage of heating means 19. This system gives good results in practice, but, besides being very bulky and costly, is subject to considerable wear inasmuch as it is composed of parts which are frequently in motion and are subjected to friction. According to the embodiment preferred by the invention which I shall now describe with reference to FIG. 7, relay 25 feeds, heating it, a resistance 40 wound on a thermistor 41, i.e. on a resistance which decreases its value in proportion to increase of its temperature.

By passing current through resistance 40, 41 heats and its resistance decreases. It is placed in series in a circuit in which heating means 19 and a source of power connected to terminals 42 are placed. As the temperature of of 41 increases, the current circulating therein and in the heating means 19 increases and, consequently the liquid passing into shunt 17 heats, heating the joint or joints 22 of the couple or couples. When this or these have reached a temperature very close to that of the operation conditions which depends, as has already been stated, on the temperature of joint 13, relay 25 is no longer energized and resistance 40 is no longer fed; then 41 cools slowly and its resistance increases. With this method, current in feed circuit of heating means 19 is never interrupted, but oscillates slightly round the theoretical value avoiding considerable discontinuity.

By means of a suitable selection of time constants of units 19–22–40–41 and more particularly, assigning small constants to units 19–22–40 and high constant to unit 41, it is possible to reach a practically negligible value for oscillations in respect of the mean theoretical value of the current. If the totalization of power supplied to heating means 19 is effected as described, through an induction electric meter for example, a totalization of the mean value is obtained. In this way continuous proportional modulation is obtained, avoiding the use of a potentiometer of the motorized type, but obtaining in practice, the same result of final measure.

The means described may be varied; thus the thermistor may be replaced by an electromagnetic reactor whose ferromagnetic nucleus is composed of variable permeability material, such permeability being in relation to temperature. If, instead of the relay 25 alone, which is generally not sensitive enough to obtain accurate measure, a series of amplification stages between the thermocouples and the member which controls heating means 19 are provided, the retarder may be inserted at any suitable point of the amplification chain, provided its last part, that controls means 19, is not an electromechanical relay, but has a non discontinuous characteristic, such as, for example, an electronic or magnetic amplifier. In this case the retarder may precede, driving it, the final amplifying stage which controls the power supplied to means 19 and that may be composed of two halves operating in opposition; in this way considerable stability is obtained as a consequence of compensation of variations, which occurs in the opposition circuits (technically called "push-pull") and exact symmetry of the oscillations of electric current in means 19 in respect of the mean theoretical value, as the two halves of the retarder are alternately energized according to the direction of unbalance of electromotive force generated by the couples.

For the sake of simplicity the thermic retarder has been described by referring to FIGS. 1 and 7, but it is obvious that it is perfectly adaptable to the device shown in FIGS. 4–6 by connecting it in circuit (not illustrated) that feeds electrodes 35, 36.

I claim:
1. A heat meter for measuring the quantity of heat absorbed by a utilizing plant, especially in a hot water heating plant in which a heating fluid passes from an inlet end to an outlet end comprising, in combination, means for separating a predetermined fraction of flow of the heating fluid at the outlet end; heating means operated by a source of power to directly heat said fractional flow to a measurement temperature; means for thermostatically controlling said heating means so that the difference between said measurement temperature and the temperature of the heating fluid at the outlet end is a predetermined fraction of the temperature drop of fluid in the plant itself, said control means comprising a first pair of thermoelectric couples located in the heating fluid and respectively at the inlet end and at the outlet end and electrically connected to produce an electromagnetic force proportionate to the difference between the temperature of the heating fluid at said inlet end and at said outlet end, and at least one second pair of thermoelectric couples respectively located in the fractional flow of heating fluid which has been separated and subjected to heating by said heating means and in the heating fluid at the outlet end and electrically connected to produce an electromagnetic force proportionate to the difference between the temperature of said fractional flow of said heating fluid and the temperature of the heating fluid at said outlet end, said second pair of couples being such as to generate an electromotive force equal in absolute value to that generated by the first pair of couples when the first mentioned difference in temperature is a predetermined multiple of the second difference in temperature, said first pair of couples being connected in opposition to said second pair of couples to a control device for said heating means, so as to determine operation of the latter when said electromotive forces are equal or different; and means for measuring the quantity of power absorbed by said heating means.

2. Heat counter according to claim 1, comprising in opposition to the first pair of thermoelectric couples a set of pairs of couples equal one to the other arranged in series so as to sum the electromotive forces, preferably such that the electromotive forces generated by each one is a multiple of that generated by the first pair of couples at equal temperature between the respective joints.

References Cited in the file of this patent

UNITED STATES PATENTS

| | | |
|---|---|---|
| 2,006,469 | Lucke | July 2, 1935 |
| 2,067,645 | Pinkerton | Jan. 12, 1937 |
| 2,329,813 | Amsler | Sept. 21, 1943 |
| 2,359,767 | Keinath | Oct. 10, 1944 |
| 2,398,606 | Wang | Apr. 16, 1946 |
| 2,831,351 | Jacobson | Apr. 22, 1958 |
| 2,850,610 | Kasuga | Sept. 2, 1958 |
| 2,931,222 | Noldge et al. | Apr. 5, 1960 |
| 2,975,260 | Carlson | May 14, 1961 |

FOREIGN PATENTS

| | | |
|---|---|---|
| 802,704 | France | June 13, 1936 |
| 225,192 | Switzerland | Apr. 16, 1943 |